United States Patent [19]

Gauron

[11] Patent Number: 4,973,208
[45] Date of Patent: Nov. 27, 1990

[54] INSET PANEL FASTENER WITH FLOATING MEMBER

[76] Inventor: Richard F. Gauron, 26020 S.E. 158th, Issaquah, Wash. 98027

[21] Appl. No.: 401,040

[22] Filed: Aug. 31, 1989

[51] Int. Cl.⁵ .............................................. F16B 39/02
[52] U.S. Cl. ........................................ 411/82; 411/258
[58] Field of Search .................. 411/82, 258, 180, 69, 411/103, 105, 107, 112, 113, 432

[56] References Cited

U.S. PATENT DOCUMENTS

| | | | |
|---|---|---|---|
| 2,235,078 | 3/1941 | Meisterhans | 411/82 |
| 3,019,865 | 2/1962 | Rohe | 411/82 X |
| 3,313,078 | 4/1967 | Rohe | 411/82 X |
| 3,339,609 | 9/1967 | Cushman | 411/82 |
| 3,504,723 | 4/1970 | Cushman et al. | 411/82 |
| 3,621,557 | 11/1971 | Cushman et al. | 411/103 X |
| 3,646,981 | 3/1972 | Barnes | 151/41.7 |
| 3,646,982 | 3/1972 | Cushman | 411/82 |
| 3,662,805 | 5/1972 | Sygnator | 411/103 |
| 3,695,324 | 10/1972 | Gulistan | 151/41.74 |
| 3,964,531 | 6/1976 | Schenk | 411/82 |
| 4,227,561 | 10/1980 | Molina | 411/103 |
| 4,417,028 | 11/1983 | Azevedo | 411/82 X |
| 4,812,193 | 3/1989 | Gauron | 156/293 |

Primary Examiner—Robert L. Wolfe
Assistant Examiner—Suzanne L. Dino
Attorney, Agent, or Firm—Joan H. Pauly; Delbert J. Barnard

[57] ABSTRACT

A fastener element (40) has a first member (41) including an outer end disk (42) and two radially spaced, axially extending flat stem legs (53). A second stem-forming member (62) has a T-shaped axial opening (64, 66) and is mechanically interlocked with the legs (53). A floating member (84) is positioned in the opening (64, 66) and has an internally threaded opening (90) which is aligned with a center opening (44) in the disk (42). The T-shaped floating member (84) is prevented from rotating in the opening (64, 66) but is allowed to move radially to automatically adjust for misalignments between a structure in which the element (40) is installed and an object to be connected thereto by means of a screw introduced into the threaded opening (90) through the disk opening (44). When the element (40) is to be installed in a structure by a potting material (34), the stem (53, 62) preferably has flow control disks (72, 74) and flat chord surfaces (54). An adhesive seal (98) between the members (41, 62) ensures that the potting material (34) is excluded from the opening (64, 66) to retain the automatic alignment capability.

9 Claims, 3 Drawing Sheets

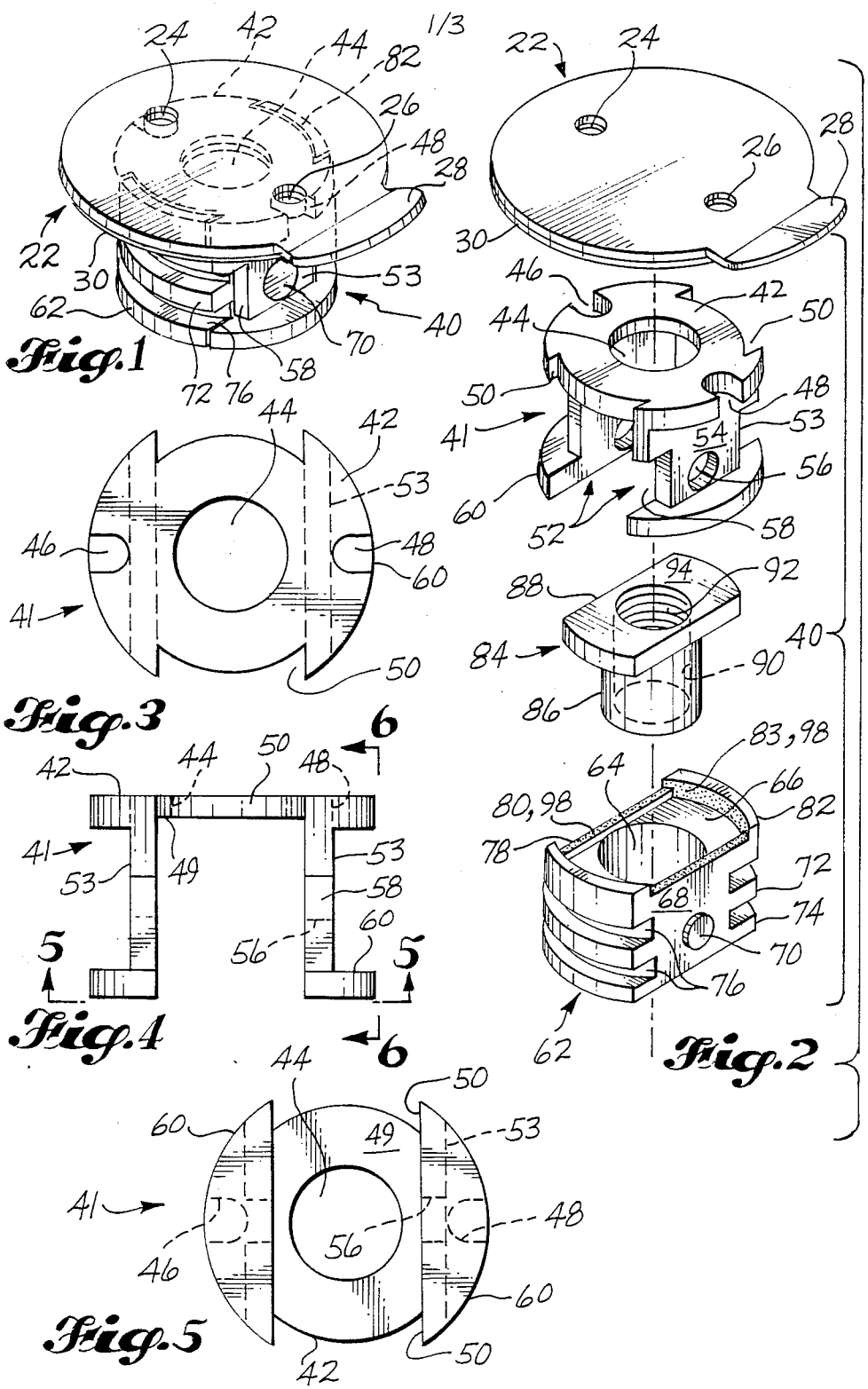

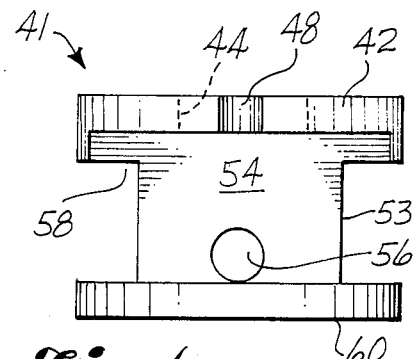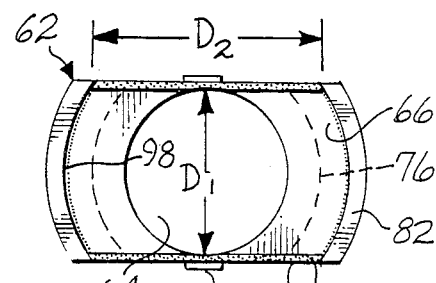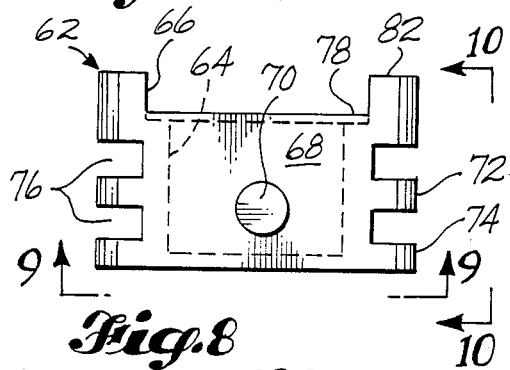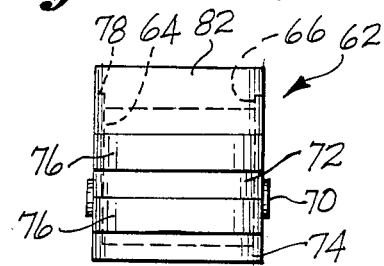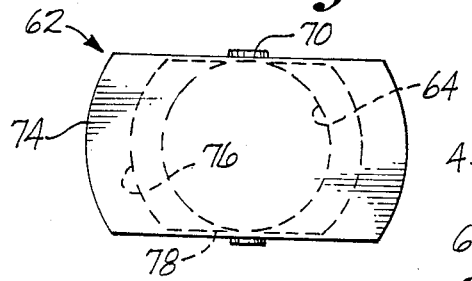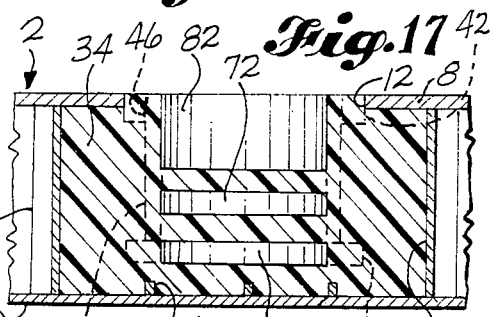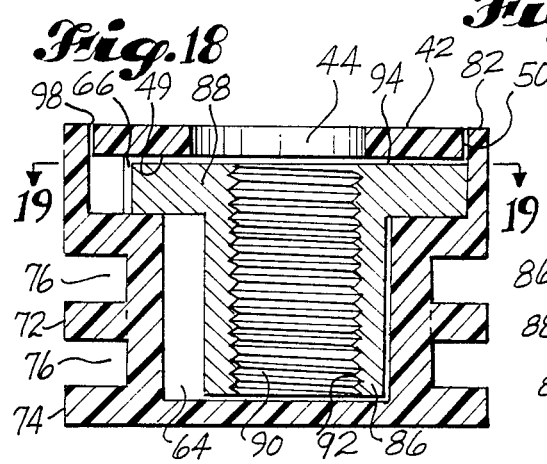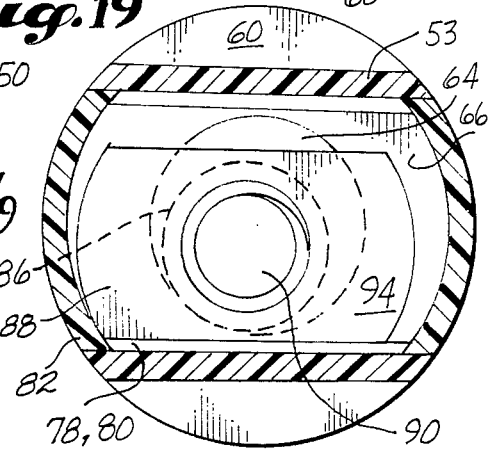

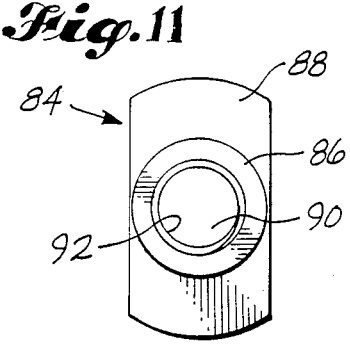
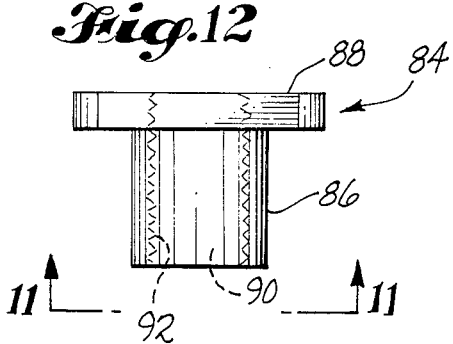
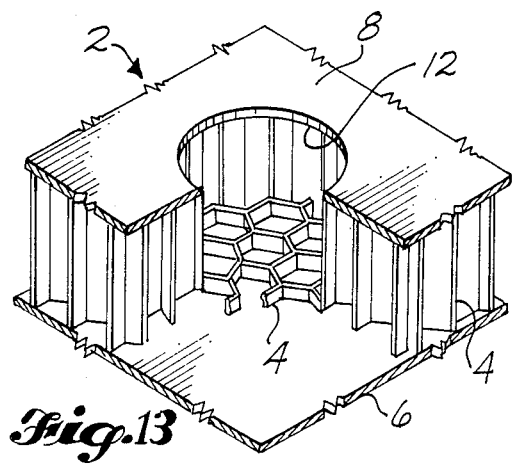
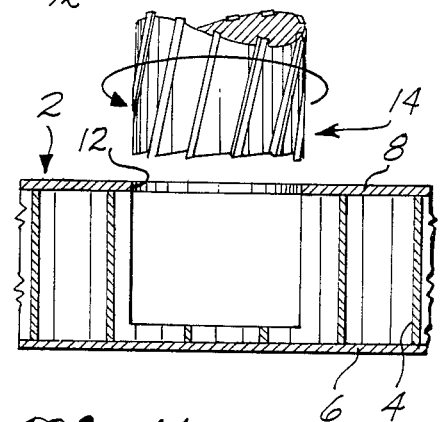
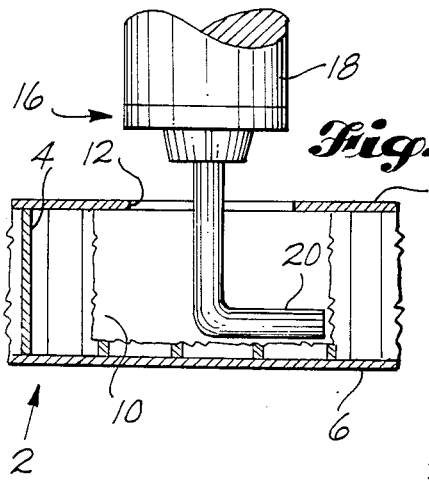
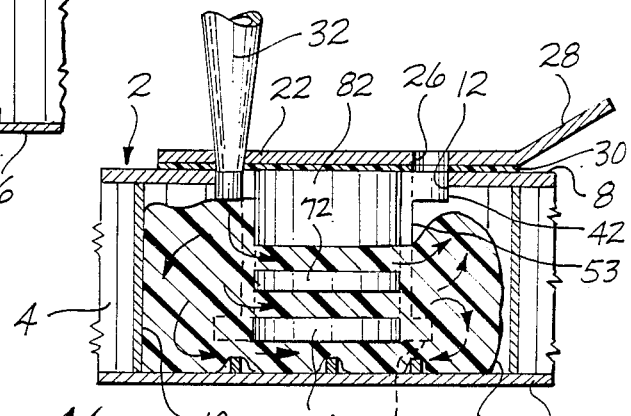

INSET PANEL FASTENER WITH FLOATING MEMBER

TECHNICAL FIELD

This invention relates to inset fastener elements for structures and, more particularly, to such an element having a floating fastener-engaging member to automatically compensate for misalignments between the structure and an object being attached thereto.

BACKGROUND ART

Inset-type fastener elements are useful for connecting various types of structures to other structures or objects. This type of fastener element is generally anchored into the structure and has an engagement portion to which a screw fastener or the like is secured in order to connect an object to the structure. This arrangement is particularly advantageous when a strong connection between the structure and the object cannot readily be obtained by securing the fastener directly to the structure without an intervening fastener element.

Sandwich panels of the type used extensively in the aircraft industry are one type of structure which is commonly connected to other structures or objects by use of inset fastener elements. In order to provide a secure anchor in the cellular honeycomb core of the panel, the inset fastener is molded into a cavity formed in the core by use of a potting material. A problem that has arisen in connection with such molded-in installations is that it is difficult to precisely align the fastener element with the fastener receiving hole or other engagement means in the object or structure to be connected to the panel.

The applicant's U.S. Pat. No. 4,812,193, granted Mar. 14, 1989, discloses improvements in molded-in type inset fastener elements which are specifically directed toward providing a stronger connection between the fastener element and the sandwich panel The disclosed fastener element has a stem with flow control disks and diametrically opposite flat chord surfaces to control flow of potting material introduced into a cavity in which the stem has been positioned. The fastener element, including the stem, is a single integral member with a center axial opening for engaging a screw. Therefore, once the potting material has set to install the element, the position of the threads cannot be adjusted to correct for misalignments.

U.S. Pat. No. 3,646,981, granted Mar. 7, 1972, to G. Barnes, discloses an insert for a sandwich panel which includes an inner internally threaded tubular member and an outer ribbed sleeve The tubular member and sleeve are joined together so that there will be no relative motion therebetween and are independently anchored in a cavity in the panel. Therefore, once the insert is installed in the panel, the position of the internal threads on the tubular member cannot be adjusted to correct for misalignments.

U.S. Pat. No. 3,695,324, granted Oct. 3, 1972, to B. Gulistan, discloses a floating nut device having a nut portion with opposite outwardly projecting tabs that are received into opposite side openings in a receptacle portion. The receptacle portion has an opening extending therethrough and bears against an outer surface of the workpiece. An attaching sleeve also has opposite tabs that are received into the side openings in the receptacle portion. The sleeve has a tubular section that extends through a central opening in the workpiece and is secured thereto by bending its outer end against the opposite surface of the workpiece. The receptacle portion provides clearance to allow floating movement of the nut to allow a bolt which is misaligned with the opening in the workpiece to be engaged in the nut. In two alternative embodiments, the receptacle portion and the attaching sleeve are formed by a single receptacle member.

The above patents and the prior art discussed and/or cited therein should be carefully considered for the purpose of putting the present invention into proper perspective relative to the prior art.

DISCLOSURE OF THE INVENTION

The present invention is directed toward the problem of alignment discussed above. In its basic form, the subject of the invention is a fastener element receivable into an opening in a structure and adapted to cooperate with a screw fastener or the like to connect an object to the structure. According to an aspect of the invention, the fastener element comprises an outer end disk having a fastener opening for receiving a fastener therethrough and an inner radial surface surrounding the fastener opening. The fastener element also includes a stem and a floating member. The stem has a first portion extending inwardly from the disk and a second portion mechanically interlocked with the first portion. The stem has an axial opening therein communicating and aligned with the fastener opening in the disk. Anchoring portions of the fastener element interlock with the structure to anchor the fastener element in the opening in the structure. The floating member is positioned in the axial opening in the stem. The member includes an engagement portion aligned with the fastener opening in the disk for engaging a fastener. An outer radial surface of the floating member is positioned to engage the inner radial surface of the disk to transmit forces therebetween and retain the member in the axial opening. The floating member and the axial opening are shaped and dimensioned to substantially prevent rotation, while permitting radial movement, of the member in the axial opening to automatically adjust for misalignments between the structure and the object.

In a preferred form of the fastener element, each of the floating member and the axial opening is generally T-shaped and has an inner portion and an outer portion. The inner portion is generally cylindrical. The outer portion has a first lateral dimension at least as great as the diameter of the inner cylindrical portion, and a second lateral dimension perpendicular to and greater than the first lateral dimension. This preferred T-shaped configuration has the advantage of effectively achieving the desired radial movement without rotation by means of a relatively simple structure.

A more specific subject of the invention is a fastener element for molded-in installation, by use of a potting material, into a cavity formed in a sandwich panel inwardly of a skin having an opening. The element is insertable into the cavity through the skin opening and includes an engagement portion to which a screw fastener or the like is secured in order to connect an object to the panel. In accordance with the invention, this type of fastener element basically further comprises an outer end disk, a stem, and a floating member having the characteristics described above. The stem has anchoring portions that interlock with the potting material to retain the fastener element in position in the cavity. The first and second portions of the stem and the disk cooperate to exclude potting material from the axial opening to prevent hindrance of radial movement of the floating member in the axial opening by the potting material. Thus, when the fastener element is fully installed and the potting material has hardened, the fastener element retains its capacity to automatically adjust for misalignments between the panel and the object being connected thereto.

In the preferred form of the molded-in type fastener, the disk has a fill opening and a vent opening extending through diametrically opposite peripheral portions thereof. One of the stem portions includes two circumferentially spaced sections that form flow passageways around the stem. The other stem portion includes reduced diameter substantially flat axial surfaces positioned circumferentially between said sections and radially inwardly of the fill opening and the vent opening, respectively. This preferred configuration of the disk and the stem facilitates installation of the fastener element and the formation of a strong connection between the element and the panel in which it is installed. When the floating member and axial opening in the stem have the preferred T-shaped configuration, the second lateral dimension of the outer portion of the axial opening is preferably substantially parallel to the axial surfaces of the stem. This arrangement helps to maintain the compactness of the fastener element while efficiently providing both flow control and automatic alignment capability.

A preferred feature of the molded-in fastener element is an adhesive seal between the second portion of the stem and the disk. The seal helps to ensure that potting material does not enter the axial opening in the stem so that the alignment capability is reliably maintained.

These and other advantages and features will become apparent from the detailed description of the best mode for carrying out the invention that follows.

BRIEF DESCRIPTION OF THE DRAWINGS

In the drawings, like element designations refer to like parts throughout, and:

FIG. 1 is a pictorial view of the preferred embodiment of the fastener element of the invention with a positioning tab of a known type attached thereto.

FIG. 2 is an exploded pictorial view of the element and tab shown in FIG. 1.

FIG. 3 is a top plan view of the member of the fastener element shown in FIGS. 1 and 2 that includes the outer end disk.

FIG. 4 is an elevational view of the member shown in FIG. 3.

FIGS. 5 and 6 are bottom and side views, respectively, taken along the lines 5—5 and 6—6 in FIG. 4.

FIG. 7 is a top plan view of the second stem portion shown in FIGS. 1 and 2.

FIG. 8 is a side elevational view of the member shown in FIG. 7.

FIGS. 9 and 10 are bottom and side views, respectively, taken along the lines 9—9 and 10—10 in FIG. 8.

FIG. 11 is a bottom plan view of the floating member shown in FIG. 2 taken along the line 11—11 in FIG. 12.

FIG. 12 is a side elevational view of the floating member.

FIG. 13 is a pictorial view of a portion of a sandwich panel with an opening formed therein for receiving a fastener element, with foreground portions cut away.

FIG. 14 is a sectional view of the panel shown in FIG. 13 illustrating the use of a cutting bit to form the opening, with the bit shown in elevation.

FIG. 15 is like FIG. 14 except that it illustrates the use of a reaming tool to widen the cavity.

FIG. 16 is a sectional view, with parts shown in elevation, illustrating the injection of potting resin to install the preferred embodiment of the fastener element.

FIG. 17 is like FIG. 16 except that it shows the fastener element fully installed.

FIG. 18 is a sectional view of the assembled preferred embodiment of the fastener element.

FIG. 19 is a partly plan, partly cross-sectional view taken along the line 19—19 in FIG. 18.

BEST MODE FOR CARRYING OUT THE INVENTION

The drawings show a fastener element 40 that is constructed according to the invention and that constitutes the best mode for carrying out the invention currently known to the applicant. FIGS. 13-17 illustrate the installation of the element 40 in a sandwich panel 2 of the type having a honeycomb core 4 sandwiched between outer skins 6, 8. It is anticipated that the primary application of the fastener of the invention will be in connection with panels 2 of the type shown in FIGS. 13-17. However, it is of course to be understood that the fastener element of the invention may also be used to advantage in connection with other types of structures. The invention is particularly advantageous for use with any type of structure to which it is difficult to directly attach a screw fastener or the like, and in situations where precise alignment with the object to be connected to the structure is difficult to achieve.

Referring to FIG. 2, the preferred embodiment of the fastener element 40 comprises three members 41, 62, 84. The first member 41 is shown in FIGS. 2-6. It includes an outer end disk 42 and a first stem portion 52 integrally attached to each other. The disk 42 has a center fastener opening 44 extending axially therethrough for receiving a fastener, such as a screw. The disk 42 also has a fill opening 46 and a vent opening 48 extending axially through diametrically opposite peripheral portions thereof. The inner radial surface 49 of the disk 42 surrounds the inner end of the fastener opening 44. The first stem portion 52 has two diametrically opposite legs 53 that extend axially inwardly from peripheral portions of the disk 42. The periphery of the disk 42 has two circumferential recesses 50 positioned between the two legs 53 of the first stem portion 52. These recesses 50 result in reduced diameter portions of the disk 42 between the legs 53 of the stem portion 52. The fill and vent openings 46, 48 are aligned with the lateral centers of the stem legs 53 and are positioned radially outwardly therefrom.

The two legs 53 of the first stem portion 52 are flat and are essentially parallel to each other. The radially spaced flat inner surfaces of the legs 53 face each other and are defined at their upper ends by chord lines of the disk 42 that also define the circumferential boundaries of the recesses 50. The outer axial or chord surface 54 of each leg 53 is spaced radially inwardly from the corresponding aligned fill or vent opening 46, 48. Each leg 53 terminates at its axially inner end in a radially outwardly extending flange 60. The flange 60 is parallel to and corresponds in shape to the segment of the circular disk 42 subtended by the chord that defines the axially outer end of the inner surface of the leg 53. A keying hole 56 extends radially through the leg 53 adjacent to the surface of the flange 60 facing the disk 42. Two notches 58 are formed in laterally opposite edges of the leg 53 adjacent to the flange 60.

The second member 62 of the fastener element 40, shown in FIGS. 2 and 7–10, forms a second stem portion 62. The stem portion 62 has opposite flat surfaces 68 that mate with the flat inner surfaces of the stem legs 53 formed by the first member 41. A projection 70 projects radially outwardly from each surface 68 and is received into the hole 56 in the corresponding stem leg 53 in the assembled fastener element 40. The legs 53 have sufficient flexibility to allow them to be snapped onto the stem portion 62. The engagement of the projections 70 in the holes 56 mechanically interlocks the two stem portions 52, 62 together. Other types of interlocking means may also be used although the projections 70 and holes 56 are currently preferred. One example of an alternative locking arrangement is one in which inwardly projecting lips on the flanges 60 snap under the bottom of member 62.

The outer circumferential surfaces of the second stem portion 62 between the flat mating surfaces 68 have flow control disks 72, 74 formed thereon. The upper or axially outer portion of the member 62 includes opposite axially extending circumferential projections 82. The projections 82 are aligned with the peripheral portions of the flow control disks 72, 74. Flow control passageways 76 around the stem 52, 62 are defined between the disks 72, 74 and each of the upper disks 72 and the corresponding projection 82. Tangent walls 78 extend between the projections 82 and define the upper portions of the mating surfaces 68.

An axial opening 64, 66 extends into the stem portion 62. The opening 64, 66 has a cylindrical inner portion 64 and a laterally elongated outer portion 66. The outer portion 66 has an open top and is defined by the circumferential projections 82 and the tangent walls 78. The resulting configuration of the opening 64, 66 is substantially T-shaped. Referring to FIG. 7, the smaller lateral dimension $D_1$ of the outer portion 66, the distance between the tangent walls 78, is at least as great as and essentially equal to the diameter of the cylindrical inner portion 64. The lateral dimension $D_2$ between the circumferential projections 82 has a minimum equal to the length of the tops 80 of the tangent walls 78 and is perpendicular to and greater than the first lateral dimension $D_1$.

In the illustrated fastener element 40, the axial opening 64, 66 is a blind opening with an inner end closed by a bottom wall of the member 62. A through opening for receiving a through-type fastener could also be provided within the scope of the invention. In such case, the lower end of the stem would preferably be provided with a means to exclude potting material from the lower end of the opening. For example, a lower end disk could be provided to snugly fit into an opening in the lower skin 6 of the panel 2.

The third member 84 of the fastener element 40, shown in FIGS. 2, 11, and 12, is a floating member 84 having a generally T-shaped configuration similar to the configuration of the axial opening 64, 66. The inner portion 86 of the floating member 84 is cylindrical. The outer portion 88 of the floating member 84 is in the form of an elongated head 88 with a plan configuration similar to the plan configuration of the outer portion 66 of the opening 64, 66. The thickness of the head 88 in the axial direction is just slightly less than the depth of the outer portion 66 of the opening 64, 66 along the tangent walls 78. An axial opening 90 extends through the member 84 and has internal threads 92 for engaging the threads of a screw fastener.

FIGS. 13–15 illustrate the preparation of a honeycomb core panel 2 for receiving the fastener element 40. FIG. 14 shows the forming of an opening 12 in the upper skin 8 and down into the core 4 by means of a known type of cutting bit 14. FIG. 15 shows the use of a reaming tool 16 to enlarge the cavity 10 in the core 4 inwardly of the skin opening 12 so that the finished cavity 10 has a larger diameter than the opening 12. The tool 16 is of a known type having a reamer 20 secured in and rotated by a chuck 18. FIG. 13 shows the panel 2 after the cutting operation to form the opening 12 but before the reaming operation. In FIG. 13, foreground portions of the honeycomb core 4 are cut away, and the thin portion of the core 4 adjacent to the lower skin 6 that remains after the cutting and reaming operations is revealed. The operations illustrated in FIGS. 13–15 are known in the art and have been used in connection with the installation of other types of inset fasteners.

The preparation of the fastener element 40 for installation may be accomplished in connection with the preparation of the panel 2. Alternatively, the element 40 may be preassembled and stored ready for installation. The assembly of the element 40 is accomplished simply by positioning the floating member 84 in the axial opening 64, 66 in the stem 52, 62 and then snapping the first member 41 of the element 40 down over the stem portion 62 so that the projections 70 are received into the keying holes 56. In the assembled element 40, the lower disks 74 and the flanges 60 complement each other to form a circular inner end disk that, together with the disks 72, forms anchoring portions of the element 40.

Preferably, an adhesive seal is provided between the members 41, 62 to ensure that potting material 34 is excluded from the axial opening 64, 66 when the fastener element 40 is installed in the panel 2. An example of a suitable type of seal is one formed by an acrylic based adhesive, such as the adhesive sold under the trademark KRAZY GLUE. The seal may be formed by a thin layer of adhesive 98 that extends along the top surfaces 80 of the tangent walls 78, up the adjacent inwardly facing surfaces 83 of the circumferential projections 82, and along the upper peripheral edges of the surfaces 83, as shown in FIG. 2. When the element 40 is assembled, the adhesive 98 on the top surfaces 80 seals the surfaces 80 against the inner radial surface 49 of the outer disk 42, and the adhesive 98 on the circumferential projection surfaces 83 seals the surfaces 83 against the inner walls of the circumferential recesses 50 of the disk 42. The projections 82 have a greater height than the tangent walls 78 so that the upper portions of the projections 82 are received into the recesses 50. The tops of the projections 82, together with the disk 42, form an annular outer portion of the fastener element 40 with a circular outer periphery.

The installation of the assembled element 40 is illustrated in FIGS. 1, 16, and 17. A positioning tab 22 of a known type is used to hold the element 40 in position while it is being molded into the cavity 10 in the panel 2. The tab 22 has a flat circular main body portion that is larger in diameter than the opening 12 in the skin 8. Diametrically opposite openings 24, 26 extend through the main body portion. A handle 28 projects at an angle from the main body portion for gripping the tab 22 and handling it during the installation procedure. An adhesive layer 30 is positioned on the lower surface of the main body portion. The tab 22 comes from the manufacturer with a protective paper backing on the layer 30 which is removed when the tab 22 is to be used.

With the protective backing removed, the tab 22 is positioned to align the holes 24, 26 therein with the fill and vent openings 46, 48 in the outer disk 42 of the fastener element 40. The tab 22 is pressed against the top surface of the disk 42 to removably secure the tab 22 to the element 40. FIG. 1 shows the tab 22 secured to the element 40. The element 40 is picked up by grasping the tab handle 28 and is then introduced into the cavity 10 in the panel 2 through the skin opening 12. In the preferred embodiment of the element 40 shown in the drawings, the diameter of the disk 42 is dimensioned so that the disk 42, complemented by the circumferential projections 82, fits snugly into the opening 12 in the skin 8. The portion of the adhesive layer 30 radially outward of the disk 42 engages the outer surface of the skin 8 to hold the element 40 securely in position during the molding-in operation.

FIG. 16 illustrates potting material 34 being introduced into the cavity 10 by means of a nozzle 32 of a sealant gun inserted into the tab opening 24 that is aligned with the disk fill opening 46. FIG. 17 illustrates the completed molding-in operation after the tab 22 has been removed. The anchoring portions 60, 72, 74 of the element 40 interlock with the hardened potting material 34 to anchor the element 40 into the structure formed by the panel 2 and the hardened material 34. In addition, the flat chord surfaces 54 help to prevent rotation of the element 40.

The potting material 34 may comprise various types of material but is preferably an epoxy resin potting material. The first and second members 41, 62 of the fastener element 40, which come into contact with the potting resin 34, are preferably made from an engineering plastic of a type to which the resin 34 will cohesively bond. The cohesive bond, in combination with the construction of the stem 52, 62 to have flow control disks 72, 74, flow passageways 76, and flat chord surfaces 54, results in an advantageous flow pattern of the resin 34 to provide a strong connection between the fastener element 40 and the panel 2. This cooperative relationship is the subject of and is described in detail in the applicant's above-cited U.S. Pat. No. 4,812,193, the text of which is incorporated herein by reference. In the element 40, the notches 58 in the stem legs 53 are aligned with the flow control disks 72 and the flow passageways 76 to allow free flow of potting material 34 out from the passageways 76 around the stem 52, 62. Since it does not contact the resin 34, the floating member 84 may be made from a variety of materials, including plastic or metal.

FIGS. 18 and 19 illustrate the relationship between the floating member 84 and the axial opening 64, 66 in which the member 84 is positioned in the assembled element 40. The inner cylindrical portion 86 and head 88 of the floating member 84 are received into the inner and outer portions 64, 66, respectively, of the axial opening 64, 66 in the stem 52, 62. The two portions 86, 88 of the floating member 84 are dimensioned to be significantly smaller than the opening portions 64, 66 into which they are received to allow the floating member 84 to move freely in any radial direction within the opening 64, 66. At the same time, the elongated configuration of the floating member head 88 and the outer opening portion 66 prevents any substantial rotation of the floating member 84 in the opening 64, 66. If some small amount of rotation occurs during engagement of a screw fastener in the threaded opening 90 of the floating member 84, the head 88 of the floating member 84 quickly engages the tangent walls 78 to prevent further rotation and facilitate the attachment of the screw fastener. The exclusion of the potting material 34 from the axial opening 64, 66 by the adhesive seal 98 ensures that the free radial movement of the floating member 84 is maintained after the fastener element 40 has been installed in the panel 2.

The axial opening 64, 66 is aligned and coaxial with the center disk opening 44 and communicates freely therewith through the open top of the stem portion 62. The threaded opening 90 in the floating member 84 is generally aligned with the opening 44 in the disk 42 and is sized so that it is always aligned with a portion of the opening 44. FIG. 18 shows the floating member 84 at the limit of its radial movement in one direction and illustrates the maintenance of the alignment of the openings 44, 90 in such a position. The maintenance of this alignment ensures that a threaded fastener introduced through the opening 44 can properly engage the threads 92 without tilting of either the screw or the floating member 84.

When a fastener is introduced into the element 40 to connect the panel 2 in which the element 40 is installed to an object, the free radial movement of the floating member 84 and the alignment of the openings 44, 90 results in automatic adjustment of the position of the floating member 84 for misalignments between the panel 2 and the object. The sizing of the disk opening 44 and the upper or outer radial surface 94 of the floating member 84 is such that, when the floating member 84 is urged upwardly by engagement of a screw fastener, its radial surface 94 will engage the inner radial surface 49 of the disk 42 to transmit forces between the floating member 84 and the disk 42 and retain the floating member 84 in the axial opening 64, 66.

It will be obvious to those skilled in the art to which this invention is addressed that the invention may be used to advantage in a variety of situations. Therefore, it is also to be understood by those skilled in the art that various modifications and omissions in form and detail may be made without departing from the spirit and scope of the invention as defined by the following claims.

What is claimed is:

1. For molded-in installation, by use of a binding material, into a cavity in a structure, a fastener element receivable into the cavity and adapted to cooperate with a screw fastener or the like to connect an object to the structure, said fastener element comprising:

an outer end disk having a fill opening and a vent opening extending through diametrically opposite peripheral portions thereof, a fastener opening for receiving a fastener therethrough, and an inner radial surface surrounding said fastener opening;

a stem including a first portion extending inwardly from said disk, and a second portion mechanically interlocked with said first portion; said stem having an axial opening therein communicating and aligned with said fastener opening in said disk; and one of said portions of the stem including two circumferentially spaced sections that form flow passageways around the stem, and the other of said portions of the stem including reduced diameter substantially flat axial surfaces positioned circumferentially between said sections and radially inwardly of the fill opening and the vent opening, respectively; and a floating member positioned in said axial opening in the stem; said member including an engagement portion aligned with said fastener opening in said disk for engaging a fastener, and an outer radial surface positioned to engage said inner radial surface of said disk to transmit forces therebetween and to retain said member in said axial opening;

said floating member and said axial opening being shaped and dimensioned to substantially prevent rotation of said member in said axial opening while permitting radial movement of said member in said axial opening to automatically adjust for misalignments between the structure and said object; and said first and second portions of the stem and said disk cooperating to exclude binding material from said axial opening to prevent hindrance of said radial movement by said material.

2. The fastener element of claim 1, in which each of the floating member and said axial opening is generally T-shaped and has a generally cylindrical inner portion with a diameter, and an outer portion with a first lateral dimension at least as great as said diameter and a second lateral dimension perpendicular to and greater than said first lateral dimension.

3. The fastener element of claim 1, in which each of the floating member and said axial opening is generally T-shaped and has a generally cylindrical inner portion with a diameter, and an outer portion with a first lateral dimension at least as great as said diameter and a second lateral dimension perpendicular to and greater than said first lateral dimension; said second lateral dimension being substantially parallel to said axial surfaces.

4. For molded-in installation, by use of a potting material, into a cavity formed in a sandwich panel inwardly of a skin having an opening, a fastener element insertable into the cavity through said opening and including an engagement portion to which a screw fastener or the like is secured in order to connect an object to the panel, said fastener element further comprising:

an outer end disk having a fill opening and a vent opening extending through diametrically opposite peripheral portions thereof, a fastener opening for receiving a fastener therethrough, and an inner radial surface surrounding said fastener opening;

a stem including a first portion extending inwardly from said disk, and a second portion mechanically interlocked with said first portion; said stem having an axial opening therein communicating and aligned with said fastener opening in said disk; and one of said portions of the stem including two circumferentially spaced sections that form flow passageways around the stem, and the other of said portions of the stem including reduced diameter substantially flat axial surfaces positioned circumferentially between said sections and radially inwardly of the fill opening and the vent opening, respectively; and a floating member positioned in said axial opening in the stem; said member including said engagement portion aligned with said fastener opening in said disk, and an outer radial surface positioned to engage said inner radial surface of said disk to transmit forces therebetween and to retain said member in said axial opening;

said floating member and said axial opening being shaped and dimensioned to substantially prevent rotation of said member in said axial opening while permitting radial movement of said member in said axial opening to automatically adjust for misalignments between the panel and said object; and said first and second portions of the stem and said disk cooperating to exclude potting material from said axial opening to prevent hindrance of said radial movement by said material.

5. The fastener element of claim 4, in which each of the floating member and said axial opening is generally T-shaped and has a generally cylindrical inner portion with a diameter, and an outer portion with a first lateral dimension at least as great as said diameter and a second lateral dimension perpendicular to and greater than said first lateral dimension.

6. The fastener element of claim 4, in which each of the floating member and said axial opening is generally T-shaped and has a generally cylindrical inner portion with a diameter, and an outer portion with a first lateral dimension at least as great as said diameter and a second lateral dimension perpendicular to and greater than said first lateral dimension; said second lateral dimension being substantially parallel to said axial surfaces.

7. The fastener element of claim 4, comprising an adhesive seal between said second portion of the stem and said disk to help ensure that potting material does not enter said axial opening.

8. The fastener element of claim 4, comprising an adhesive seal between said second portion of the stem and said disk to help ensure that potting material does not enter said axial opening.

9. The fastener element of claim 4, in which said first and second stem portions are made from a plastic material to which said potting material will cohesively bond.

* * * * *

UNITED STATES PATENT AND TRADEMARK OFFICE
CERTIFICATE OF CORRECTION

PATENT NO. : 4,973,208
DATED : November 27, 1990
INVENTOR(S) : Richard F. Gauron It is certified that error appears in the above-identified patent and that said Letters Patent is hereby corrected as shown below:

In column 1, line 38, there is a period after "panel".

In column 1, line 51, there is a period after "sleeve".

In claim 8, column 10, line 46, "claim 4" should be
-- claim 9 --.

Signed and Sealed this

Twelfth Day of May, 1992

Attest:

DOUGLAS B. COMER

*Attesting Officer*   *Acting Commissioner of Patents and Trademarks*